US012319496B2

(12) United States Patent
Koga et al.

(10) Patent No.: US 12,319,496 B2
(45) Date of Patent: Jun. 3, 2025

(54) THERMAL STRESS MITIGATION SYSTEM FOR ELECTRIC REFUSE VEHICLE

(71) Applicant: Oshkosh Corporation, Oshkosh, WI (US)

(72) Inventors: Jeffrey Koga, Oshkosh, WI (US); Emily Davis, Rochester, MN (US); Clinton T. Weckwerth, Pine Island, MN (US); Vincent Hoover, Byron, MN (US); Zachary L. Klein, Rochester, MN (US); Jerrod Kappers, Oshkosh, WI (US); Derek A. Wente, Austin, MN (US); Logan Gary, Oshkosh, WI (US); Joshua D. Rocholl, Rochester, MN (US); Chad K. Smith, Omro, WI (US)

(73) Assignee: OSHKOSH CORPORATION, Oshkosh, WI (US)

(*) Notice: Subject to any disclaimer, the term of this patent is extended or adjusted under 35 U.S.C. 154(b) by 689 days.

(21) Appl. No.: 17/484,040

(22) Filed: Sep. 24, 2021

(65) Prior Publication Data

US 2022/0097962 A1 Mar. 31, 2022

Related U.S. Application Data

(60) Provisional application No. 63/084,139, filed on Sep. 28, 2020.

(51) Int. Cl.
*B65F 3/02* (2006.01)

(52) U.S. Cl.
CPC ..................................... *B65F 3/02* (2013.01)

(58) Field of Classification Search
CPC ....... B65F 3/02; B65F 2001/1494; A62C 3/07
USPC ........................................................... 169/46
See application file for complete search history.

(56) References Cited

U.S. PATENT DOCUMENTS

| | | | | | |
|---|---|---|---|---|---|
| 2,946,802 | A | | 7/1960 | Zima et al. | |
| 4,411,318 | A | * | 10/1983 | Zeischegg ................ | A62C 3/00 220/88.3 |
| 5,171,121 | A | | 12/1992 | Smith et al. | |
| 5,378,010 | A | | 1/1995 | Marino et al. | |
| 5,934,867 | A | * | 8/1999 | Christenson ............ | B65F 3/041 414/812 |
| 5,984,609 | A | * | 11/1999 | Bartlett ..................... | B65F 3/06 414/420 |
| 9,981,803 | B2 | | 5/2018 | Davis et al. | |

(Continued)

*Primary Examiner* — Claire E Rojohn, III
(74) *Attorney, Agent, or Firm* — FOLEY & LARDNER LLP

(57) ABSTRACT

A refuse vehicle includes a chassis, a body assembly coupled to the chassis, and a thermal stress mitigation system. The body assembly defines a refuse compartment. The thermal stress mitigation system is configured to mitigate against a thermal stress on the refuse vehicle. The thermal stress mitigation system includes a thermal stress mitigation substance, at least one of a container and a tank, one or more nozzles, a controller, one or more thermal sensors. The controller is structured to receive thermal stress data from the sensors, determine whether the thermal stress is greater than a threshold thermal stress based on the thermal stress data from the sensors, and operate the nozzles to deploy the thermal stress mitigation substance on the refuse vehicle responsive to determining that the thermal stress is greater than the threshold thermal stress.

8 Claims, 15 Drawing Sheets

(56) References Cited

U.S. PATENT DOCUMENTS

| | | | | |
|---|---|---|---|---|
| D869,332 | S | 12/2019 | Gander et al. | |
| D899,452 | S | 10/2020 | Klimes et al. | |
| 10,800,605 | B2 | 10/2020 | Rocholl et al. | |
| 10,843,379 | B2 | 11/2020 | Rocholl et al. | |
| 10,858,231 | B2 | 12/2020 | Holmes et al. | |
| 10,859,167 | B2 | 12/2020 | Jax et al. | |
| D910,670 | S | 2/2021 | Klimes et al. | |
| 10,997,802 | B2 | 5/2021 | Koga et al. | |
| 11,001,135 | B2 | 5/2021 | Yakes et al. | |
| 11,001,440 | B2 | 5/2021 | Rocholl et al. | |
| 11,007,863 | B2 | 5/2021 | Yakes et al. | |
| 11,021,078 | B2 | 6/2021 | Rocholl et al. | |
| 11,046,329 | B2 | 6/2021 | Clifton et al. | |
| 11,059,436 | B2 | 7/2021 | Wildgrube et al. | |
| 11,097,617 | B2 | 8/2021 | Rocholl et al. | |
| 11,110,977 | B2 | 9/2021 | Smith et al. | |
| 11,136,187 | B1 | 10/2021 | Koga et al. | |
| 11,137,002 | B2 | 10/2021 | Clifton et al. | |
| 11,148,550 | B2 | 10/2021 | Rocholl et al. | |
| 11,148,880 | B1 | 10/2021 | Koga et al. | |
| 11,161,415 | B1 | 11/2021 | Koga et al. | |
| 11,167,919 | B1 | 11/2021 | Koga et al. | |
| 11,254,498 | B1 | 2/2022 | Koga et al. | |
| 11,254,499 | B2 | 2/2022 | Rocholl et al. | |
| 11,254,500 | B2 | 2/2022 | Buege et al. | |
| 11,659,039 | B2 * | 5/2023 | Skaaksrud | A62C 37/40 340/521 |
| 11,922,736 | B2 * | 3/2024 | Koga | G07C 5/0816 |
| 2002/0071336 | A1 | 6/2002 | Smith et al. | |
| 2015/0075822 | A1 * | 3/2015 | Hoke | A62C 37/36 169/61 |
| 2018/0265289 | A1 | 9/2018 | Davis et al. | |
| 2019/0039407 | A1 | 2/2019 | Smith | |
| 2019/0322321 | A1 | 10/2019 | Schwartz et al. | |
| 2020/0030647 | A1 * | 1/2020 | Ryczek | A62C 35/023 |
| 2020/0262366 | A1 | 8/2020 | Wildgrube et al. | |
| 2020/0265656 | A1 | 8/2020 | Koga et al. | |
| 2020/0316816 | A1 | 10/2020 | Messina et al. | |
| 2020/0317083 | A1 | 10/2020 | Messina et al. | |
| 2020/0346547 | A1 | 11/2020 | Rocholl et al. | |
| 2020/0346556 | A1 | 11/2020 | Rocholl et al. | |
| 2020/0346557 | A1 | 11/2020 | Rocholl et al. | |
| 2020/0346657 | A1 | 11/2020 | Clifton et al. | |
| 2020/0346854 | A1 | 11/2020 | Rocholl et al. | |
| 2020/0346855 | A1 | 11/2020 | Rocholl et al. | |
| 2020/0346856 | A1 | 11/2020 | Rocholl et al. | |
| 2020/0346858 | A1 | 11/2020 | Buege et al. | |
| 2020/0346859 | A1 | 11/2020 | Buege et al. | |
| 2020/0346861 | A1 | 11/2020 | Rocholl et al. | |
| 2020/0346862 | A1 | 11/2020 | Rocholl et al. | |
| 2020/0347659 | A1 | 11/2020 | Rocholl et al. | |
| 2020/0347661 | A1 | 11/2020 | Rocholl et al. | |
| 2020/0348681 | A1 | 11/2020 | Clifton et al. | |
| 2020/0348764 | A1 | 11/2020 | Clifton et al. | |
| 2020/0399058 | A1 | 12/2020 | Rocholl et al. | |
| 2021/0031649 | A1 | 2/2021 | Messina et al. | |
| 2021/0054942 | A1 | 2/2021 | Jax et al. | |
| 2021/0069934 | A1 | 3/2021 | Rocholl et al. | |
| 2021/0070595 | A1 | 3/2021 | Holmes et al. | |
| 2021/0139303 | A1 | 5/2021 | Rosencrance et al. | |
| 2021/0221216 | A1 | 7/2021 | Yakes et al. | |
| 2021/0225095 | A1 | 7/2021 | Koga et al. | |
| 2021/0229755 | A1 | 7/2021 | Schwartz et al. | |
| 2021/0229908 | A1 | 7/2021 | Rocholl et al. | |
| 2021/0252995 | A1 | 8/2021 | Rocholl et al. | |
| 2021/0316740 | A1 | 10/2021 | Clifton et al. | |
| 2021/0316741 | A1 | 10/2021 | Clifton et al. | |
| 2021/0323436 | A1 | 10/2021 | Rocholl et al. | |
| 2021/0323437 | A1 | 10/2021 | Rocholl et al. | |
| 2021/0323438 | A1 | 10/2021 | Rocholl et al. | |
| 2021/0323763 | A1 | 10/2021 | Koga et al. | |
| 2021/0323764 | A1 | 10/2021 | Koga et al. | |
| 2021/0324880 | A1 | 10/2021 | Wente et al. | |
| 2021/0325529 | A1 | 10/2021 | Koga et al. | |
| 2021/0325911 | A1 | 10/2021 | Koga et al. | |
| 2021/0326550 | A1 | 10/2021 | Kappers et al. | |
| 2021/0327164 | A1 | 10/2021 | Koga et al. | |
| 2021/0327170 | A1 * | 10/2021 | Rocholl | B60Q 9/00 |
| 2021/0327237 | A1 | 10/2021 | Rocholl et al. | |
| 2021/0331635 | A1 | 10/2021 | Wildgrube et al. | |
| 2021/0331636 | A1 | 10/2021 | Wildgrube et al. | |
| 2021/0331637 | A1 | 10/2021 | Wildgrube et al. | |
| 2021/0339632 | A1 | 11/2021 | Rocholl et al. | |
| 2021/0339648 | A1 | 11/2021 | Koga et al. | |
| 2021/0339949 | A1 | 11/2021 | Rocholl et al. | |
| 2021/0345062 | A1 | 11/2021 | Koga et al. | |
| 2021/0373560 | A1 | 12/2021 | Koga et al. | |
| 2021/0380179 | A1 | 12/2021 | Smith et al. | |
| 2021/0396251 | A1 | 12/2021 | Clifton et al. | |
| 2021/0407222 | A1 | 12/2021 | Koga et al. | |
| 2022/0009338 | A1 | 1/2022 | Yakes et al. | |
| 2022/0033181 | A1 | 2/2022 | Koga et al. | |
| 2022/0096884 | A1 * | 3/2022 | Koga | B65F 3/041 |
| 2022/0097633 | A1 * | 3/2022 | Koga | H01M 50/249 |
| 2022/0097962 | A1 * | 3/2022 | Koga | B65F 3/02 |
| 2022/0185582 | A1 * | 6/2022 | Koga | B65F 3/20 |
| 2022/0212046 | A1 * | 7/2022 | Pena | A62C 37/50 |
| 2022/0249892 | A1 * | 8/2022 | Weinbrenner | A62C 37/40 |
| 2022/0407174 | A1 * | 12/2022 | Sandahl | H01M 50/249 |
| 2024/0017104 | A1 * | 1/2024 | Moretti | B60L 50/66 |
| 2024/0075815 | A1 * | 3/2024 | Koga | F15B 11/17 |

* cited by examiner

THERMAL STRESS MITIGATION SYSTEM FOR ELECTRIC REFUSE VEHICLE

CROSS REFERENCE TO RELATED APPLICATION

This application claims priority to U.S. Provisional Application No. 63/084,139, filed Sep. 28, 2020, which is incorporated herein by reference in its entirety.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment relates to a refuse vehicle. The refuse vehicle includes a chassis, a body assembly coupled to the chassis, and an energy device coupled to the body assembly. The body assembly defines a refuse compartment. The refuse vehicle also includes a thermal stress mitigation system. The thermal stress mitigation system is configured to mitigate against a thermal stress on the energy device. The thermal stress mitigation system includes a thermal stress mitigation substance, at least one of a container and a tank configured to store the thermal stress mitigation substance, and one or more nozzles fluidly coupled to the at least one of the container and the tank. The thermal stress mitigation system also includes a controller configured to operate the nozzles such that the nozzles can deploy the thermal stress mitigation substance. The thermal stress mitigation system also includes a controller one or more thermal sensors coupled to the controller and configured to detect the thermal stress on the energy device. The controller is structured to receive thermal stress data from the sensors and determine that the thermal stress is greater than a threshold thermal stress based on the thermal stress data from the sensors. The controller is also structured to operate the nozzles to deploy the thermal stress mitigation substance on the energy device responsive to determining that the thermal stress is greater than the threshold thermal stress.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
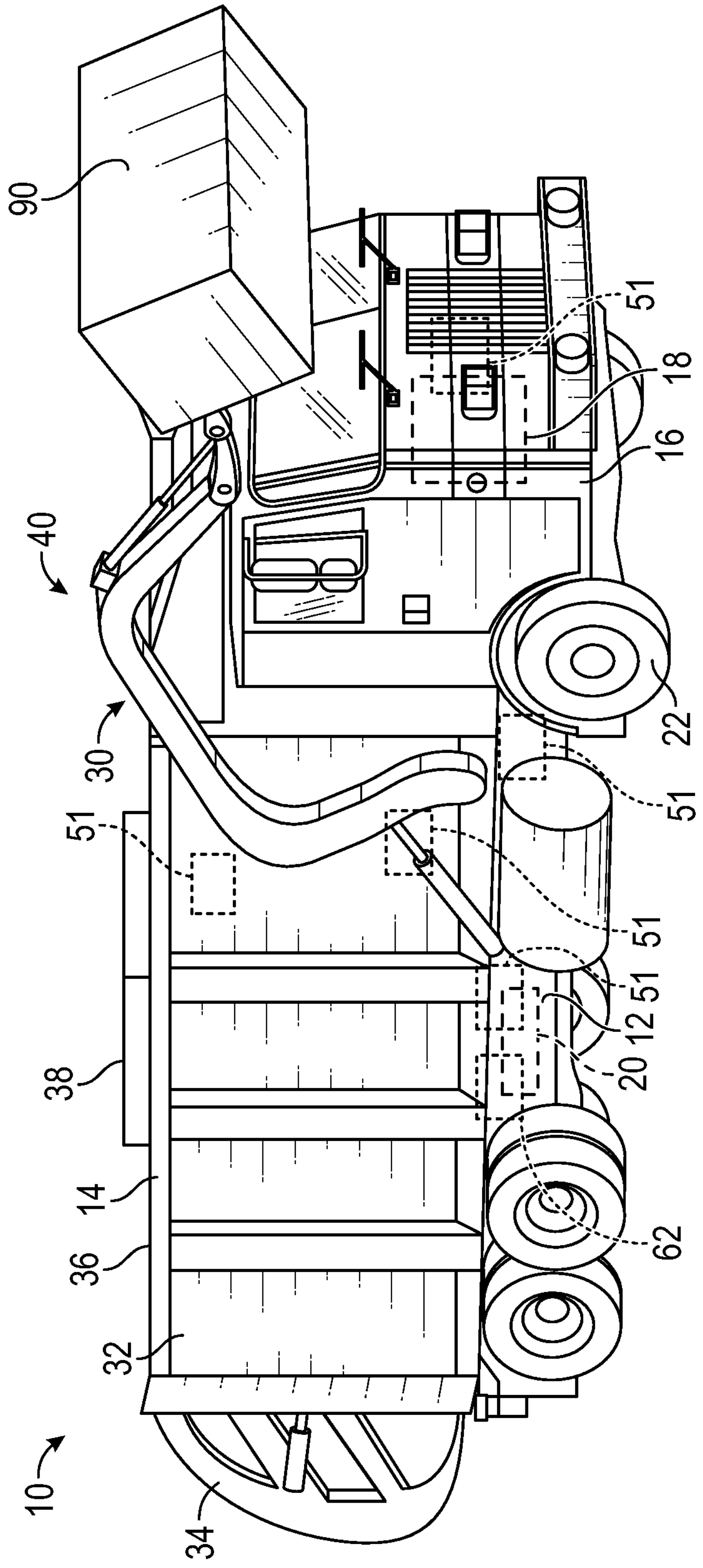
FIG. 1 is a perspective view of a refuse vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

It should be noted that the phrase "thermal stress" and variations thereof, as used herein to describe various embodiments, and in addition to the normal meaning of "thermal stress", are used to indicate a thermal load, thermal cycling, thermal event, or other thermal properties of a member. Such thermal properties may include a steady state temperature, a change in thermal energy, a thermal energy flux, etc.

According to an exemplary embodiment, a thermal stress mitigation system for a refuse vehicle is disclosed herein. The thermal stress mitigation system of the present disclosure provides many advantages over conventional systems. The thermal stress mitigation system is configured to mitigate against a thermal stress (e.g., thermal load, thermal cycling, thermal event, etc.) acting on one or more components of the refuse vehicle.

The thermal stress mitigation system includes various thermal sensors (e.g., thermal cameras, digital thermometers, etc.) positioned on several components of the refuse vehicle. In some embodiments, the thermal sensors may include other sensing devices such as a camera, an audio recording device, an audio recording device, a pressure sensors, etc. According to various exemplary embodiments, the thermal sensors may be positioned on or near a body, a hopper, an engine, an E-PTO, a propulsion system, an energy generation and/or storage device (e.g., battery, etc.), a hydraulic system, etc. of the refuse vehicle. The thermal stress mitigation system also includes a thermal stress mitigation substance (e.g., retardant blanket, fluid, foam, a powder, etc.). The thermal stress mitigation may be stored in a container (e.g., a hopper, a bin, etc.) and/or a storage tank (e.g., canister, reservoir, etc.) prior to use. In other embodiments, the thermal stress mitigation substance is otherwise stored prior to use. The thermal stress mitigation system also includes one or more nozzles fluidly coupled to the storage tank and configured to deploy the thermal stress mitigation substance on energy devices (e.g., batteries, etc.) of the refuse vehicle.

According to various exemplary embodiments, the thermal stress mitigation system also includes a controller that receives sensor data (e.g., temperature/thermal data, etc.) from the sensors. The controller is structured to receive sensor data (e.g., temperature/thermal data, etc.) from the sensors. Based on the sensor data, the controller determines if the thermal stress on the energy storage and/or generation devices of the refuse vehicle is above a threshold thermal stress. The controller is also structured to operate the nozzles to deploy the thermal stress mitigation substance based on the thermal stress being above the threshold thermal stress.

In other embodiments, the thermal stress mitigation system can be manually triggered by a user. For example, a user may identify a thermal stress on the refuse vehicle 10 and deploy the thermal stress mitigation system manually (e.g., from a control within the cab.)

As shown in FIG. 1, a vehicle, shown as refuse vehicle 10 (e.g., a garbage truck, a waste collection truck, a sanitation truck, a recycling truck, etc.), is configured as a front-loading refuse truck. In other embodiments, the refuse vehicle 10 is configured as a side-loading refuse truck or a rear-loading refuse truck. In still other embodiments, the vehicle is another type of vehicle (e.g., a skid-loader, a telehandler, a plow truck, a boom lift, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.) forward of the body 14. The cab 16 may include various components to facilitate operation of the refuse vehicle 10 by an operator (e.g., a seat, a steering wheel, actuator controls, a user interface, switches, buttons, dials, etc.).

As shown in FIG. 1, the refuse vehicle 10 includes a prime mover, shown as electric motor 18, and an energy system (e.g., an energy storage and/or generation device, a battery pod, a battery cell, etc.), shown as an energy device 20. In other embodiments, the prime mover is or includes an internal combustion engine (e.g., a hybrid engine, etc.). According to the exemplary embodiment shown in FIG. 1, the electric motor 18 is coupled to the frame 12 at a position beneath the cab 16. The electric motor 18 is configured to provide power to a plurality of tractive elements, shown as wheels 22 (e.g., via a drive shaft, axles, etc.). In other embodiments, the electric motor 18 is otherwise positioned and/or the refuse vehicle 10 includes a plurality of electric motors to facilitate independently driving one or more of the wheels 22. In still other embodiments, the electric motor 18 or a secondary electric motor is coupled to and configured to drive a hydraulic system that powers hydraulic actuators. According to the exemplary embodiment shown in FIG. 1, the energy device 20 is coupled to the frame 12 beneath the body 14. In other embodiments, the energy device 20 is otherwise positioned (e.g., within a tailgate of the refuse vehicle 10, beneath the cab 16, along the top of the body 14, within the body 14, etc.).

According to an exemplary embodiment, the energy device 20 is configured to receive, generate, and/or store power. The energy device 20 is also configured to provide electric power to the electric motor 18 to drive the wheels 22, electric actuators of the refuse vehicle 10 to facilitate operation thereof (e.g., lift actuators, tailgate actuators, packer actuators, grabber actuators, etc.), and/or other electrically operated accessories of the refuse vehicle 10 (e.g., displays, lights, user controls, etc.). The energy device 20 may include one or more rechargeable batteries (e.g., lithium-ion batteries, nickel-metal hydride batteries, lithium-ion polymer batteries, lead-acid batteries, nickel-cadmium batteries, iron-ion batteries, etc.), capacitors, solar cells, generators, power buses, etc. In one embodiment, the refuse vehicle 10 is a completely electric refuse vehicle. In other embodiments, the refuse vehicle 10 includes an internal combustion generator that utilizes one or more fuels (e.g., gasoline, diesel, propane, natural gas, hydrogen, etc.) to generate electricity. The electricity may be used to charge one or more battery cells of the energy device 20, power the electric motor 18, power the electric actuators, and/or power the other electrically operated accessories (e.g., a hybrid refuse vehicle, etc.). For example, the refuse vehicle 10 may have an internal combustion engine augmented by the electric motor 18 to cooperatively provide power to the wheels 22. The energy device 20 may thereby be charged via an on-board generator (e.g., an internal combustion generator, a solar panel system, etc.), from an external power source (e.g., overhead power lines, mains power source through a charging input, etc.), and/or via a power regenerative braking system. The energy device 20 may then provide power to the electrically operated systems of the refuse vehicle 10. In some embodiments, the energy device 20 includes a heat management system (e.g., liquid cooling, heat exchanger, air cooling, etc.) shown as thermal stress mitigation system 60.

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted (e.g., by a packer system, etc.). The refuse compartment 30 may provide temporary storage for refuse during transport to a waste disposal site and/or a recycling facility. In some embodiments, at least a portion of the body 14 and the refuse compartment 30 extend above or in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30, a front-loading refuse vehicle, a side-loading refuse vehicle, etc.). In other embodiments, the storage volume is positioned between the hopper volume and the cab 16 (e.g., a rear-loading refuse vehicle, etc.).

As shown in FIG. 1, the refuse vehicle 10 includes a lift mechanism/system (e.g., a front-loading lift assembly, etc.), shown as lift assembly 40, coupled to the front end of the body 14. In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). As shown in FIG. 1, the lift assembly 40 is configured to engage a container (e.g., a residential trash receptacle, a commercial trash receptacle, a container having a robotic grabber arm, etc.), shown as refuse container 60. The lift assembly 40 may include various actuators (e.g., electric actuators, hydraulic actuators, pneumatic actuators, etc.) to facilitate engaging the refuse container 60, lifting the refuse container 60, and tipping refuse out of the refuse container 60 into the hopper volume of the refuse compartment 30 through an opening in the cover 36 or through the tailgate 34. The lift assembly 40 may thereafter return the empty refuse container 60 to the ground. According to an exemplary embodiment, a door, shown as top door 38, is movably coupled along the cover 36 to seal the opening thereby preventing refuse from escaping the refuse compartment 30 (e.g., due to wind, bumps in the road, etc.).

As shown in FIG. 1, the refuse vehicle 10 also includes a thermal stress mitigation system 60. The thermal stress mitigation system includes a plurality of sensing devices shown as thermal sensors 51 (e.g., thermal cameras, digital thermometers, etc.). The thermal sensors 51 are positioned on or near various components of the refuse vehicle 10. As shown in FIG. 1, for example, the thermal sensors 51 may be placed on or near the electric motor 18, the energy device 20, the refuse compartment 30, the lift assembly 40. In other embodiments, the thermal sensors 51 are positioned on or near other components of the refuse vehicle 10. The thermal sensors 51 are configured to sense or detect thermal data (e.g., temperature, thermal energy, etc.) from a component of the refuse vehicle 10. For example, one of the thermal sensors 51 may be positioned on or near the hydraulic systems of the lift assembly 40 and may be configured to sense or detect thermal data associated with the lift assembly 40 or a portion thereof.

The thermal stress mitigation system 60 also includes thermal stress mitigation devices 62. The thermal stress mitigation devices 62 are configured to mitigate the thermal stress load acting on the energy device 20. The thermal stress mitigation devices 62 are accordingly positioned on, near, or within the energy device 20.

Figure 2A:
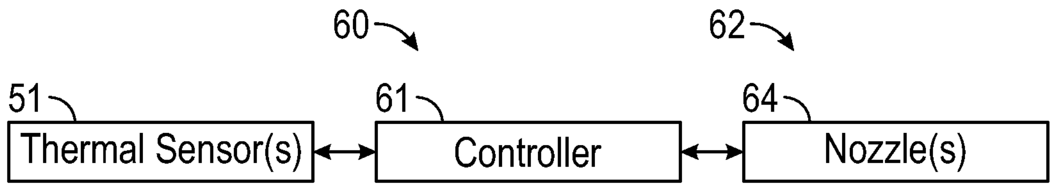
FIG. 2A is a block diagram of a thermal stress mitigation system, according to an exemplary embodiment.

As shown in FIG. 2A, the thermal stress mitigation system includes one or more thermal sensors 51, a controller 61 and thermal stress mitigation device 62 shown as one or more nozzles 64. These and other components of the thermal stress mitigation system 60 are described in detail below.

According to various exemplary embodiments, the thermal stress mitigation devices 62 are configured to deploy a thermal stress mitigation substance. The thermal stress mitigation substance is configured to mitigate the thermal stress of a component of the refuse vehicle 10. The thermal stress mitigation substance may be configured as a fluid, a gel, a foam, a retardant blanket, a thermal stress mitigation package, etc. Accordingly the thermal stress mitigation device 62 may have a wide variety of configurations such that the thermal stress mitigation device 62 are suitably capable of deploying the thermal stress mitigation substance. For example, and as shown in FIG. 2A, the thermal stress mitigation device 62 may include one or more nozzles 64. In other embodiments, the thermal stress mitigation device 62 may include one or more of a pressure relieve device, a valve, an actuator, etc. In these arrangements, the thermal stress mitigation device 62 may be configured to be activated by a controller. In other embodiments, the thermal stress mitigation device 62 are pressure activated, temperature activated, or manually activated. In yet other embodiments, the thermal stress mitigation device 62 includes a cooling system (e.g., an air conditioner, a heat sink, a fan, an evaporative cooler, etc.) configured to reduce the temperature of one or more components of the refuse vehicle 10. In these arrangements, the cooling system is configured to mitigate thermal stresses.

Figure 2B:
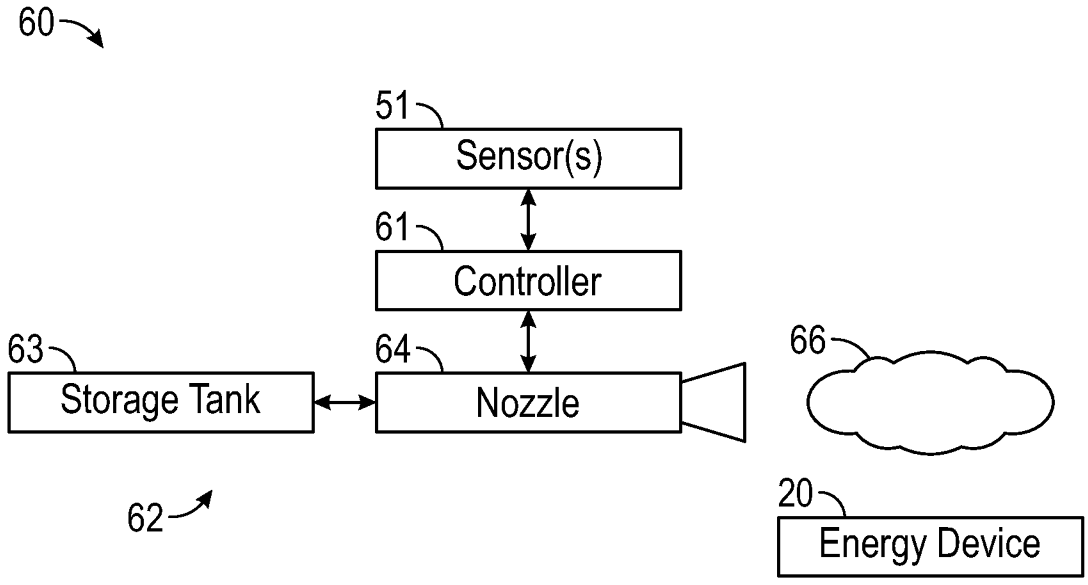
FIG. 2B is a detailed block diagram of a thermal stress mitigation system, according to an exemplary embodiment.

As shown in FIG. 2B, the thermal stress mitigation system 60 includes one or more sensors 51 and various thermal stress mitigation devices 62 including one or more nozzles 64. The thermal stress mitigation system 60 also includes a storage tank 63 that is configured to store a thermal stress mitigation substance 66. The thermal stress mitigation system 60 also includes a controller 61 coupled to the one or more sensors 51 and the one or more nozzles 64. The thermal stress mitigation system 60 is configured to deploy the thermal stress mitigation substance 66 on various components of the refuse vehicle 10 of FIG. 1. For example, and as shown in FIG. 2B, the thermal stress mitigation system may deploy the thermal stress mitigation substance 66 on or near the energy device 20. In other embodiments, the thermal stress mitigation system may be configured to deploy the thermal stress mitigation substance 66 on or near the cab 16, the electric motor 18, the refuse compartment 30 etc. In these arrangements, the thermal stress mitigation system 60 is configured to be coupled to the refuse vehicle 10 and proximal the particular component (e.g., the cab 16, the electric motor 18, the energy device 20, the refuse compartment 30, etc.)

The one or more thermal sensors 51 are positioned on or near various components of the refuse vehicle 10 and configured to collect thermal data of the various components, as described above. The one or more thermal sensors 51 are also coupled to the controller 61 such that the controller 61 receives the thermal data from the one or more thermal sensors 51.

The controller 61 is configured to receive thermal data from the one or more thermal sensors 51. The controller 61 may determine a thermal stress or a predicted thermal stress based on the thermal data. The controller 61 may determine if the thermal stress (or predicted thermal stress) is above a thermal stress threshold. If the thermal stress is above the thermal stress threshold, the controller 61 may deploy a thermal stress mitigation sequence to mitigate the thermal stress. In other embodiments, the controller 61 may otherwise determine that a mitigation event is occurring or may occur and active activate the thermal stress mitigation system. As part of and/or in response to determining that the mitigation event is occurring or may occur, the controller 61 may provide a signal. The signal may be provided onboard the vehicle (e.g., via a light on the dash, via an alert on a screen of the vehicle, etc.) and/or to a remote server (e.g., a vehicle fleet management system, etc.). According to an exemplary embodiment, the thermal stress determined by the controller 61 acts on (or is predicted to act on) the energy device 20. In other embodiments, the thermal stress may act on other components of the refuse vehicle 10. In some embodiments, the controller is part of the thermal stress mitigation devices 62 such that each of the thermal stress mitigation devices 62 includes a controller 61. In other embodiments, a single controller 61 is located on the refuse vehicle 10 (e.g., in the cab 16, on the body 14, etc.).

The one or more nozzles 64 are configured to receive the thermal stress mitigation substance 66 from the storage tank 63. In some embodiments, the one or more nozzles 64 are also configured to be operable between a closed position and an open position by the controller 61. When the one or more nozzles 64 are in the closed position, the thermal stress mitigation substance 66 may be pressurized against a valve of the one or more nozzles 64. When the one or more nozzles 64 are in the open position, the thermal stress mitigation substance 66 may flow through the nozzle and onto or near the energy device 20. In other embodiments, the one or more nozzles 64 is always open. In these arrangements, the controller 61 may operate a pump or valve that is fluidly coupled to the one or more nozzles 64 such that the one or more nozzles 64 are provided with the thermal stress mitigation substance 66.

The storage tank 63 is configured to store the thermal stress mitigation substance 66. In some embodiments, the storage tank 63 may be part of the thermal stress mitigation devices 62 and positioned as shown in FIG. 1. In other embodiments, the storage tank 63 is positioned away from the thermal stress mitigation devices 62. Additionally, in some embodiments, the storage tank 63 is configured as a pressurized canister such that the thermal stress mitigation substance 66 is pressurized against the nozzles 64 when the nozzles 64 are in a closed position. In other embodiments, the storage tank 63 is configured as a reservoir and includes a pump such that the thermal stress mitigation substance 66 is pumped from the storage tank 63 to the nozzle 64. That is, the pump provides the pressure necessary to move the thermal stress mitigation substance 66 from the storage tank 63 to the nozzle 64.

The thermal stress mitigation substance 66 may be configured to mitigate the thermal stress of a component of the refuse vehicle 10. As shown in FIG. 2, for example, the thermal stress mitigation substance 66 may be deployed on or near the energy device 20 to mitigate the thermal stress acting on the energy device 20. In some embodiments, the thermal stress mitigation substance 66 is configured as a fluid (e.g., a liquid, a gas, etc.). In other embodiments, the thermal stress mitigation substance 66 is configured as a foam. In yet other embodiments, the thermal stress mitigation substance 66 is configured as a retardant blanket. In these arrangements, the nozzles 64 are configured to deploy the retardant blanket such that the retardant blanket mitigates thermal stress on the energy device 20.

Figure 3:
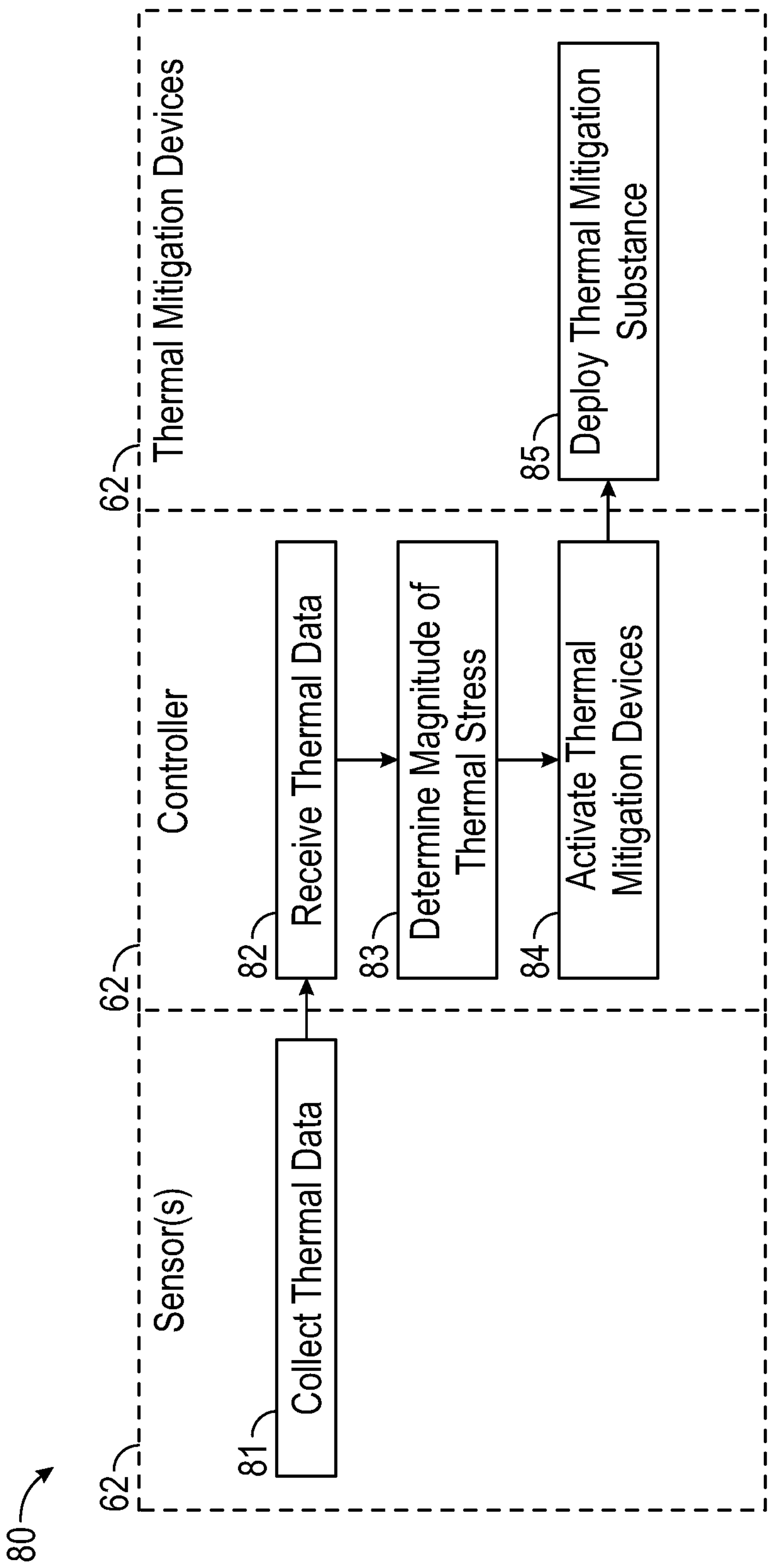
FIG. 3 is a flowchart of a method of deploying a thermal stress mitigation system, according to an exemplary embodiment.

Now referring to FIG. 3 a flowchart for a method 80 of a thermal stress mitigation sequence is shown, according to an exemplary embodiment. The method 80 may include additional steps or some steps may be omitted or skipped. Additionally, the steps may be performed concurrently, partially concurrently, or sequentially. According to an exemplary embodiment, the method is performed by the one or more sensors 61, the controller 61, and the thermal stress mitigation devices 62.

At step 81, the one or more sensors 51 collect thermal data from nearby components. For example, the one or more sensors 51 may sense or detect a temperature of the cab 16, the electric motor 18, the energy device 20, and/or the refuse compartment 30 of FIG. 1.

At step 82, the controller 61 receives the thermal data from the one or more sensors 51. At step 83, the controller 61 determines the magnitude of thermal stress acting on a component. Additionally, the controller 61 may determine a predicted thermal stress. The controller may also identify the component as a thermally stressed component.

At step 84, the controller 61 may determine that the thermal stress (or predicted thermal stress) is above a thermal stress threshold. Based on the determination, the controller 61 may active the thermal stress mitigation devices 62 (e.g., the one or more nozzles 64 or a pump, valve, or other pressurized device coupled thereto). In some embodiments, step 84 may also include controlling various components of the refuse vehicle 10. For example, the controller may be configured to alert a user (e.g., via a display or indication within the cab 16) and stop refuse vehicle function such as stopping power supply to and from the energy device 20. In other embodiments, step 84 may include operating various components of the refuse vehicle 10. For example, the controller 61 may be configured to operate the cover 36 to open or close the refuse compartment 30, the packer system to compact the load within the compartment 30, or other components of the refuse vehicle 10 of FIG. 1.

At step 85, the thermal stress mitigation devices 62 deploy the thermal stress mitigation substance 68 onto or near the thermally stressed component. In some embodiments, step 85 may include providing an indication to a user that the thermal stress mitigation devices were deployed. In some embodiments, the indication may be provided on a control panel within the cab 16 of FIG. 1 (e.g., on a display, on an indication light, audibly through speakers, etc.). In other embodiments, the indication may be provided on an exterior surface of the refuse vehicle 10 of FIG. 1.

In some embodiments, the thermal stress mitigation substance 68 may be deployed preemptively. For example, the thermal stress mitigation substance 68 may be deployed prior to operating the refuse vehicle 10 or prior to the thermal stress reaching the thermal stress threshold.

Now referring generally to FIGS. 3-10, the energy device 20, the thermal sensors 51, and the thermal stress mitigation devices 62 each may be positioned in various locations on the refuse vehicle 10. For example, the energy device 20 may be coupled to the frame 12, the body 14, the cab 15, or other parts of the refuse vehicle 10. Similarly, the thermal sensors 51 may be coupled to the frame 12, the body 14, the cap 15, the energy device 20, and/or other parts of the refuse vehicle 10 as described above and shown in FIG. 1. The thermal stress mitigation devices 62 may be positioned on or near the energy device 20. In some embodiments, the refuse vehicle 10 may include more than one energy device 20. In these arrangements, each of the energy devices 20 may similarly be coupled to the frame 12, the body 14, the cab 15, or other parts of the refuse vehicle 10 each with one of the thermal sensors 51 and/or one of the thermal stress mitigation devices 62 on or near the energy device 20.

Figure 4:
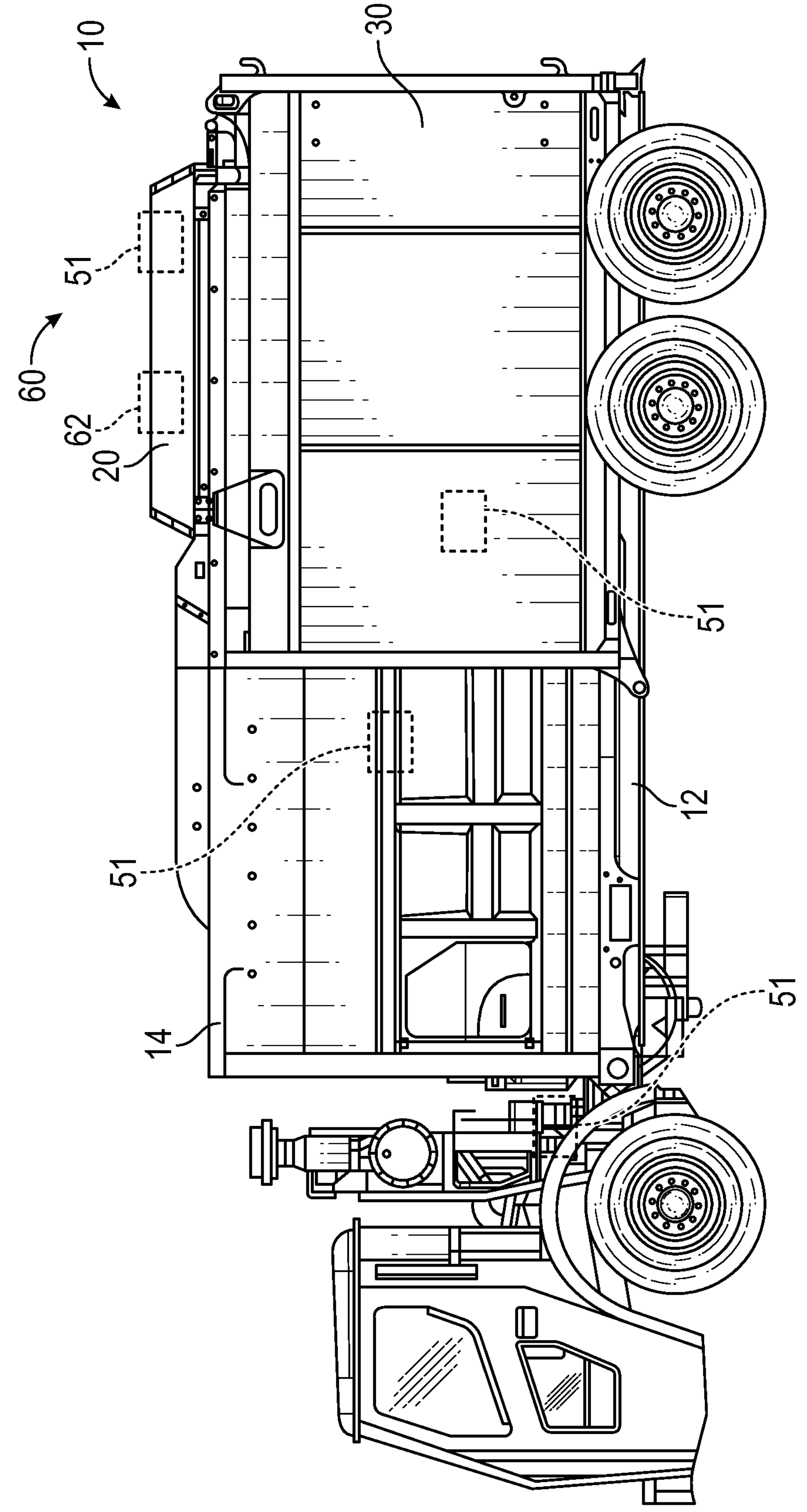
FIG. 4 is a side view of the refuse vehicle of FIG. 1 having a top mounted battery pod, according to an exemplary embodiment.

As shown in FIG. 4, the energy device 20 is coupled to the rearward top portion of the body 14. Additionally, one of the thermal sensors 51 and the thermal stress mitigation devices 62 are coupled to the energy device 20. In other embodiments, the energy device 20, one or more thermal sensors 51, and the thermal stress mitigation devices 62 are coupled to the forward top portion of the body 14. In some embodiments, one or more of the energy device 20, the thermal sensors 51, and the thermal stress mitigation devices 62 are removable/detachable from the body 14 such that the energy device 20, the thermal sensors 51, and/or the thermal stress mitigation devices 62 are serviceable, upgradable, replaceable, etc.

Figure 5:
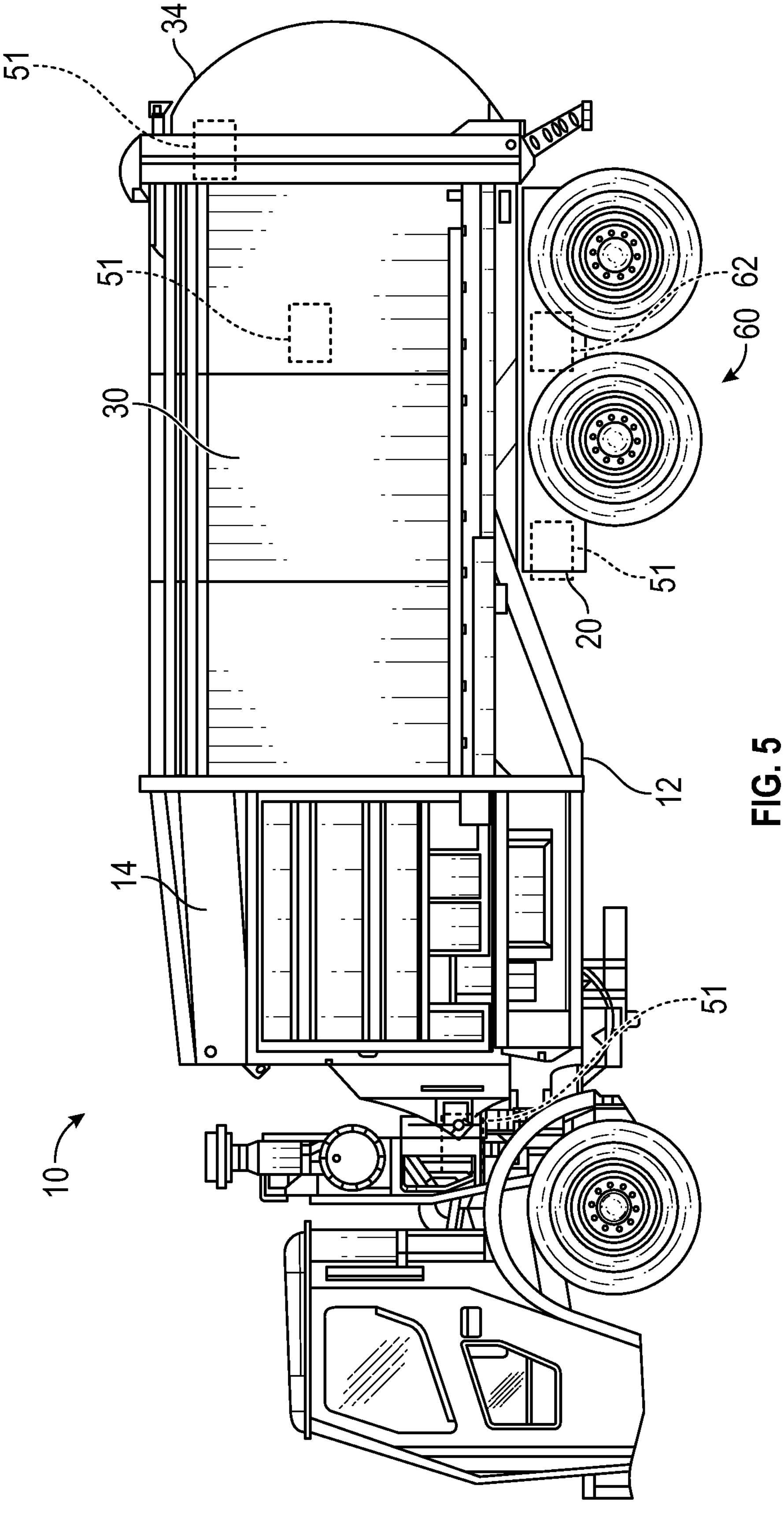
FIG. 5 is a side view of the refuse vehicle of FIG. 1 having a bottom mounted battery pod, according to an exemplary embodiment.

As shown in FIG. 5, the energy device 20, the thermal sensors 51, and the thermal stress mitigation devices 62 are coupled to the rearward bottom portion of the body 14. In other embodiments, the energy device 20, the thermal sensors 51, and the thermal stress mitigation devices 62 are coupled to the forward bottom portion of the body 14. As described above, the energy device 20, the thermal sensors 51, and the thermal stress mitigation devices 62 each may be removable/replaceable. For example, the refuse vehicle 10 may include a door on the side of the body 14 to allow removal and replacement of the energy device 20, the thermal sensors 51, and/or the thermal stress mitigation devices 62. In some embodiments, the energy device 20, the thermal sensors 51, and/or the thermal stress mitigation devices 62 are located on a track such that the energy device 20, the thermal sensors 51, and/or the thermal stress mitigation devices 62 can be slid out from the body 14 similar to a drawer.

Figure 6:
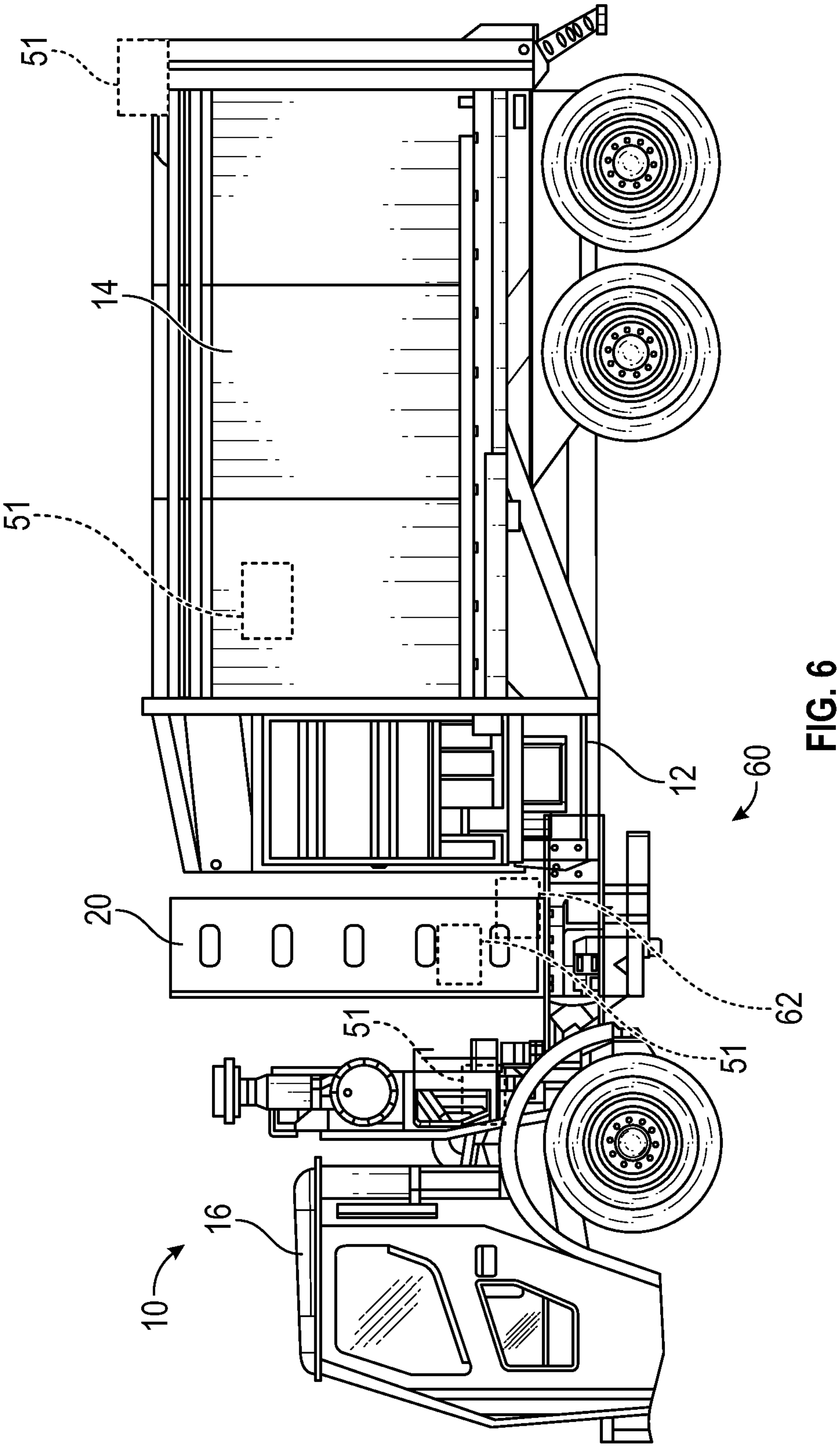
FIG. 6 is a side view of the refuse container of FIG. 1 having a centrally mounted battery pod, according to an exemplary embodiment.

As shown in FIG. 6, the energy device 20, the thermal sensors 51, and the thermal stress mitigation devices 62 are coupled between the cab 16 and the body 14. In some embodiments, the energy device 20, the thermal sensors 51, and the thermal stress mitigation devices 62 are coupled to the frame 12. The energy device 20, the thermal sensors 51, and/or the thermal stress mitigation devices 62 may be easily accessed and/or removed from the refuse vehicle 10. For example, the energy device 20 may include forklift pockets so that a forklift may easily remove the energy device 20 from the refuse vehicle 10. In some embodiments, the energy device 20 includes one or more eyelet connectors to receive a lifting hook or similar hoisting attachment. The energy device 20 may be configured to connect to an external rail system to quickly replace the energy device 20 by sliding it orthogonally off the refuse vehicle 10. In some embodiments, the thermal sensors 51 and the thermal stress mitigation devices 62 may be coupled to the energy device 20 such that the thermal sensors 51 and the thermal stress mitigation devices 62 are removed with the energy device 20. In other embodiments, the thermal sensors 51 and the thermal stress mitigation devices 62 are coupled to the refuse vehicle 10 (e.g., coupled to the frame 12, etc.).

In some embodiments, the energy device 20 is configured to dynamically change position on the refuse vehicle 10 based on loading of the refuse vehicle 10. For example, the energy device 20 may translate horizontally along the frame 12 toward the cab 16 or toward the body 14 to change a weight distribution of the vehicle. In some embodiments, the energy device 20 includes one or more controllers to measure the weight distribution of the refuse vehicle 10 and adjust a position of the energy device 20 accordingly.

Figure 7:
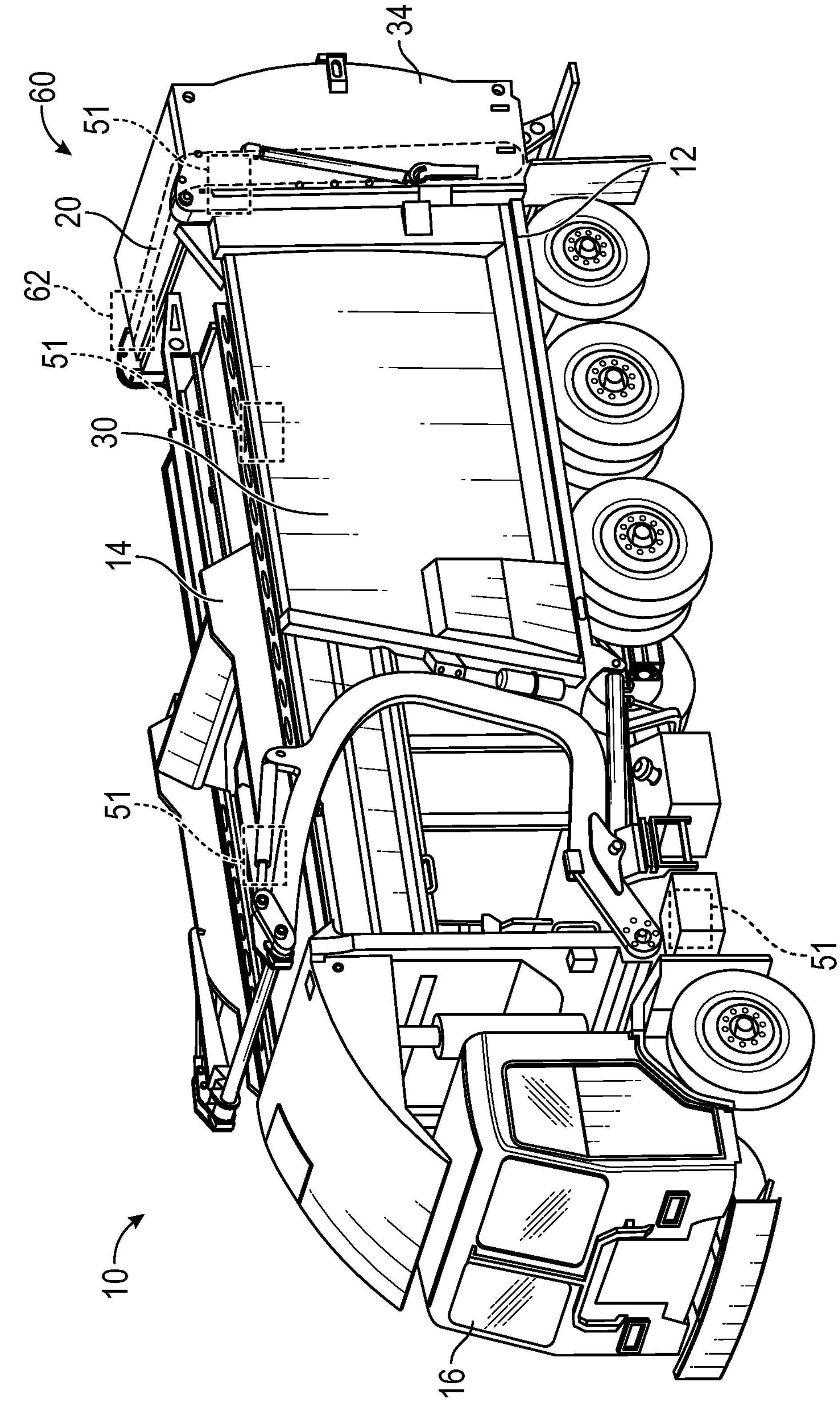
FIG. 7 is a perspective view of the refuse container of FIG. 1 having a tailgate mounted battery pod, according to an exemplary embodiment.

As shown in FIG. 7, the energy device 20, the thermal sensors 51, and the thermal stress mitigation devices 62 are coupled to the tailgate 34 of the refuse vehicle 10. In some embodiments, the energy device 20, the thermal sensors 51, and the thermal stress mitigation devices 62 are positioned vertically along a rearward side of the refuse compartment 30. In some embodiments, the energy device 20, the thermal sensors 51, and the thermal stress mitigation devices 62 are positioned substantially near the base of the tailgate 34 or as part of the tailgate 34. The energy device 20, the thermal sensors 51, and the thermal stress mitigation devices 62 may be configured to be accessible via the tailgate 34. For example, a user could open the tailgate 34 to reveal the energy device 20, the thermal sensors 51, and the thermal stress mitigation devices 62. In some embodiments, the tailgate 34 includes one or more rotating elements (e.g., hinges, mechanical bearings) to facilitate rotation around a rearward corner of the refuse compartment 30. For example, the tailgate 34 could include one or more hinging mechanisms on a side to allow a user to open the tailgate 34 like a door and gain access to the energy device 20, the thermal sensors 51, and the thermal stress mitigation devices 62 located along the frame 12 of the refuse vehicle 10. In some embodiments, the tailgate 34 is a double door. Swinging the tailgate 34 open like a door requires less energy than lifting the tailgate 34.

In some embodiments, the tailgate 34 is fully integrated with the energy device 20 and is configured to be removable/replaceable. In these arrangements, the thermal sensors 51 and the thermal stress mitigation devices 62 are coupled to the energy device 20. For example, a first tailgate 34 having a first energy device 20, a first thermal sensor 51, and a first thermal stress mitigation device 62 could be replaced by a second tailgate 34 having a second energy device 20, a second thermal sensor 51 and a second thermal stress mitigation device 62 when one or more of the batteries of the first energy device 20 are depleted of energy or the first thermal stress mitigation device 62 is depleted of thermal stress mitigation substance (e.g., thermal stress mitigation substance 66 of FIG. 2). Removing and replacing the tailgate 34 may limit loss of vehicle operation due to charging time because the tailgate 34 including the depleted energy device 20 may be charged separately of the refuse vehicle 10. Similarly, the first thermal stress mitigation device 62 may be refilled with additional thermal stress mitigation substance 66.

Figure 8:
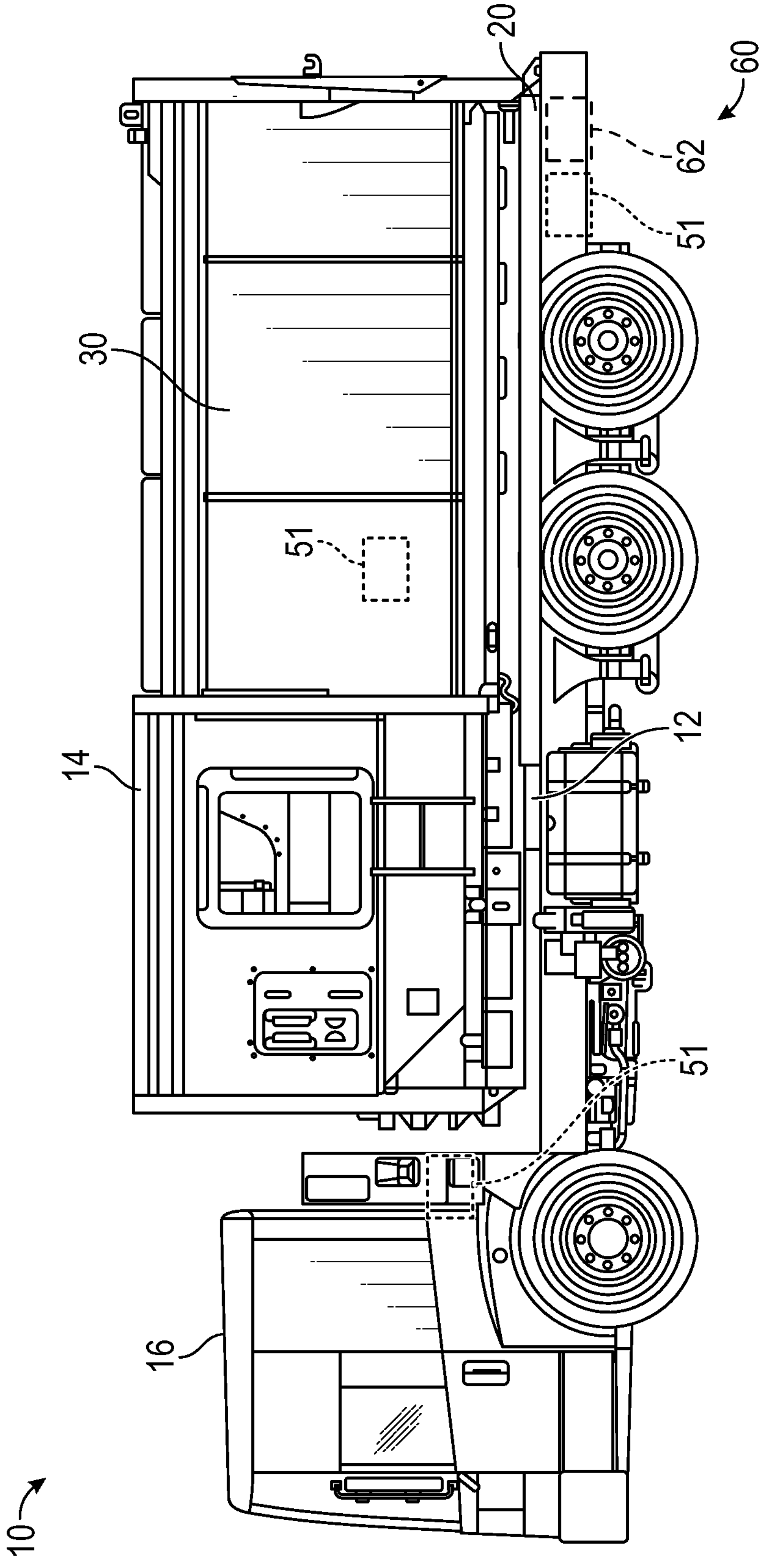
FIG. 8 is a side view of the refuse container of FIG. 1 having a frame mounted battery pod, according to an exemplary embodiment.

As shown in FIG. 8, the energy device 20, the thermal sensors 51, and the thermal stress mitigation devices 62 are positioned between the body 14 and the frame 12. As described above, in some embodiments, the energy device 20, the thermal sensors 51, and/or the thermal stress mitigation devices 62 may be configured to translate horizontally along the frame 12 of the refuse vehicle 10. For example, the energy device 20 could move between a forward portion and a rearward portion of the body 14 of the refuse vehicle 10 such that the refuse vehicle 10 is evenly loaded. In this arrangement, the thermal sensors 51 and the thermal stress mitigation devices 62 are coupled to the energy device 20. As described above, in some embodiments, the energy device 20, the thermal sensors 51, and the thermal stress mitigation devices 62 are each removable and/or replaceable. The energy device 20, the thermal sensors 51, and/or the thermal stress mitigation devices 62 may be accessed via a door on a side of the body 14 or via the tailgate 34. In some embodiments, the energy device 20, the thermal sensors 51, and/or the thermal stress mitigation devices 62 can be accessed by removing the refuse compartment 30. For example, a refuse vehicle with a removable refuse compartment (e.g., a container truck) may remove the refuse compartment to reveal the energy device 20, the thermal sensors 51, and/or the thermal stress mitigation devices 62. In some embodiments, the energy device 20, the thermal sensors 51, and/or the thermal stress mitigation devices 62 are each coupled to the refuse compartment 30 itself and can be removed with the refuse compartment 30.

Referring now to FIGS. 9A-10B, several illustrations of an exemplary placement of the energy device 20 are shown, according to several exemplary embodiments. In various embodiments, the energy device 20, the thermal sensors 51, and the thermal stress mitigation devices 62 are coupled to a rearward top portion of the refuse vehicle 10 (e.g., above the refuse compartment 30, etc.). Additionally or alternatively, the energy device 20, the thermal sensors 51, and the thermal stress mitigation devices 62 are coupled to a rearward portion of the refuse vehicle 10. For example, the energy device 20, the thermal sensors 51, and the thermal stress mitigation devices 62 may be coupled to the tailgate 34 and/or a rearward portion of the refuse compartment 30 (e.g., as shown in FIGS. 7A-7C). As another example, the energy device 20, the thermal sensors 51, and the thermal stress mitigation devices 62 may be coupled to a vertical rear surface of the refuse compartment 30. In some embodiments, the energy device 20 (or components thereof), the thermal sensors 51, and the thermal stress mitigation devices 62 are coupled to the wheel 22. In some embodiments, the energy device 20 (or components thereof), the thermal sensors 51, and the thermal stress mitigation devices 62 are coupled to a front and rear wheelset of the refuse vehicle 10 (e.g., as shown in FIGS. 7A-7C). In various embodiments, placement of the energy device 20, the thermal sensors 51, and the thermal stress mitigation devices 62 as shown in FIGS. 7A-7C facilitates shifting weight rearward on the refuse vehicle 10, thereby reducing strain on forward load bearing components (e.g., a front axle, etc.). In some embodiments, the placement of the energy device 20, the thermal sensors 51, and the thermal stress mitigation devices 62 shown in FIGS. 7A-7C is preferred for a rear-loading refuse vehicle 10. In various embodiments, one or more of the energy device 20, the thermal sensors 51, and the thermal stress mitigation devices 62 include a different number and/or arrangement of components than shown explicitly in the FIGURES. For example, the energy device 20 may include a first component coupled to an exterior hub surface of the front wheels 22 electrically coupled to a second component integrated with the tailgate 34. Additionally, the thermal stress mitigation devices may include additional controllers, pumps, storage tanks, etc. coupled to various parts of the refuse vehicle 10. In some embodiments, the placement of the energy device 20, the thermal sensors 51, and the thermal stress mitigation devices 62 shown in FIGS. 8A-8B is preferred for a front-loading refuse vehicle 10 and/or a side-loading refuse vehicle 10. In various embodiments, the energy device 20 (or components thereof), the thermal sensors 51, and the thermal stress mitigation devices 62, are detachable from the refuse vehicle 10 as described in detail above.

Figure 9A:
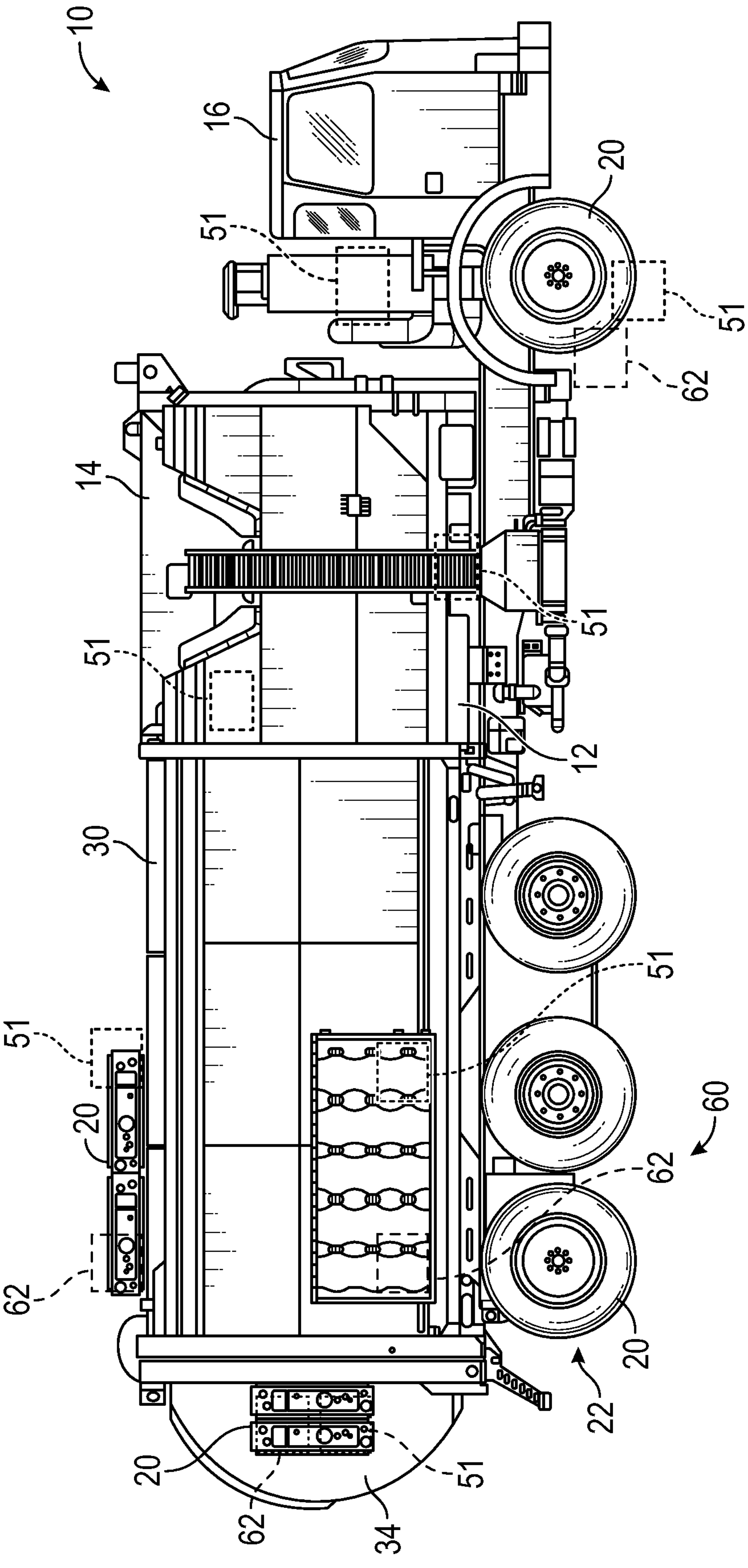
FIGS. 9A-10B are the refuse vehicle of FIG. 1 having multiple battery pods, according to several exemplary embodiments.
Figure 9B:
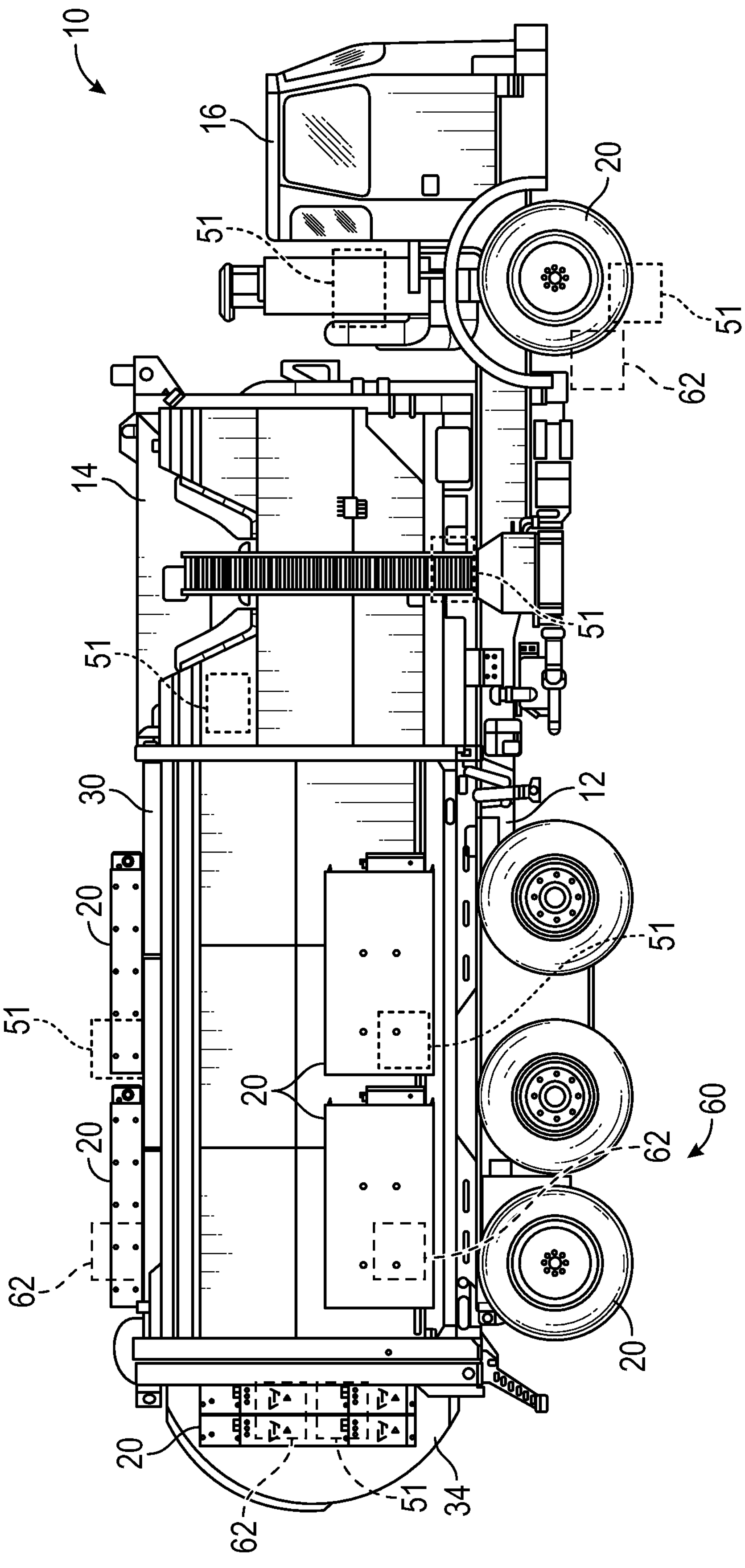
Figure 9C:
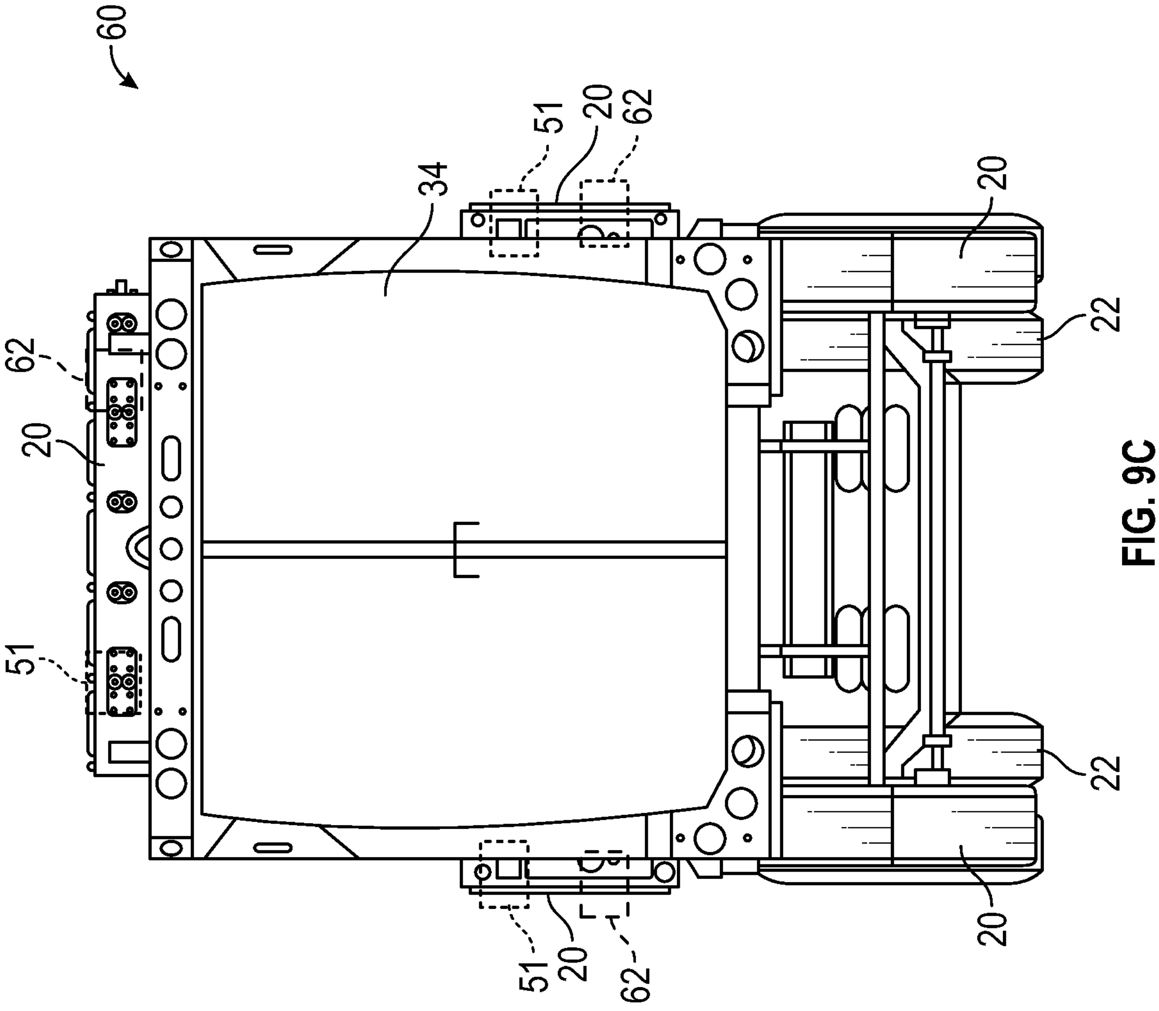
Figure 10A:
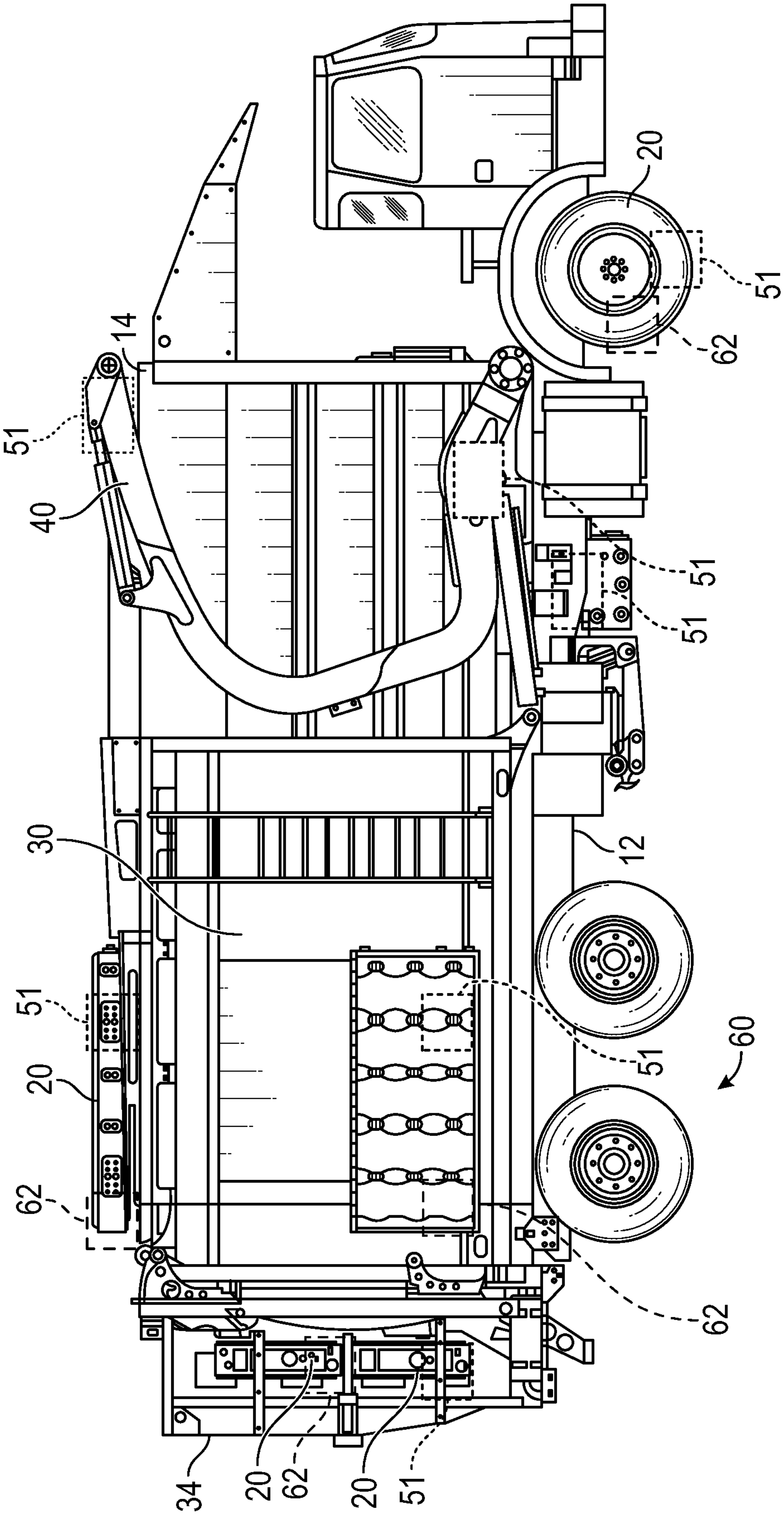
Figure 10B:
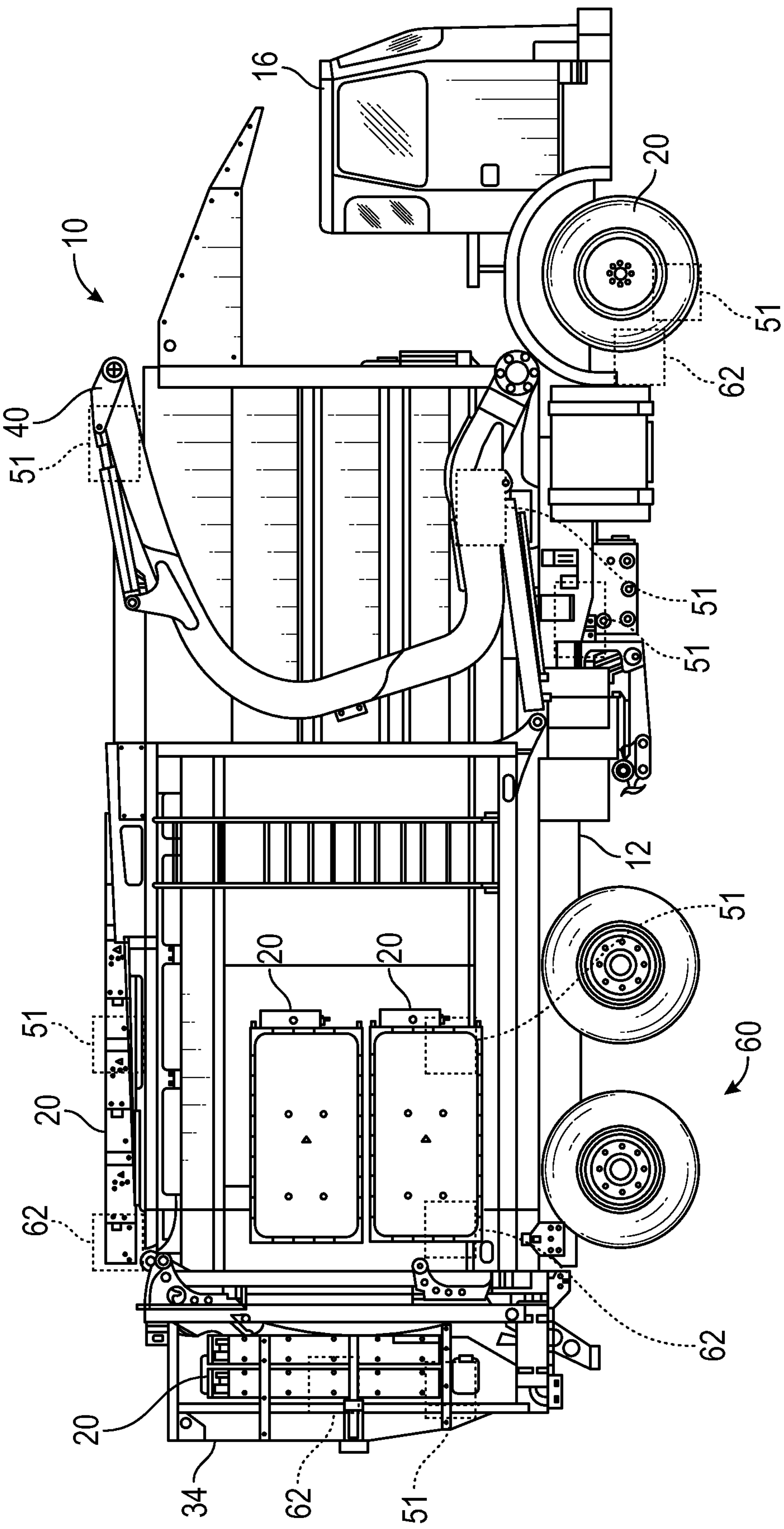
Figure 11A:
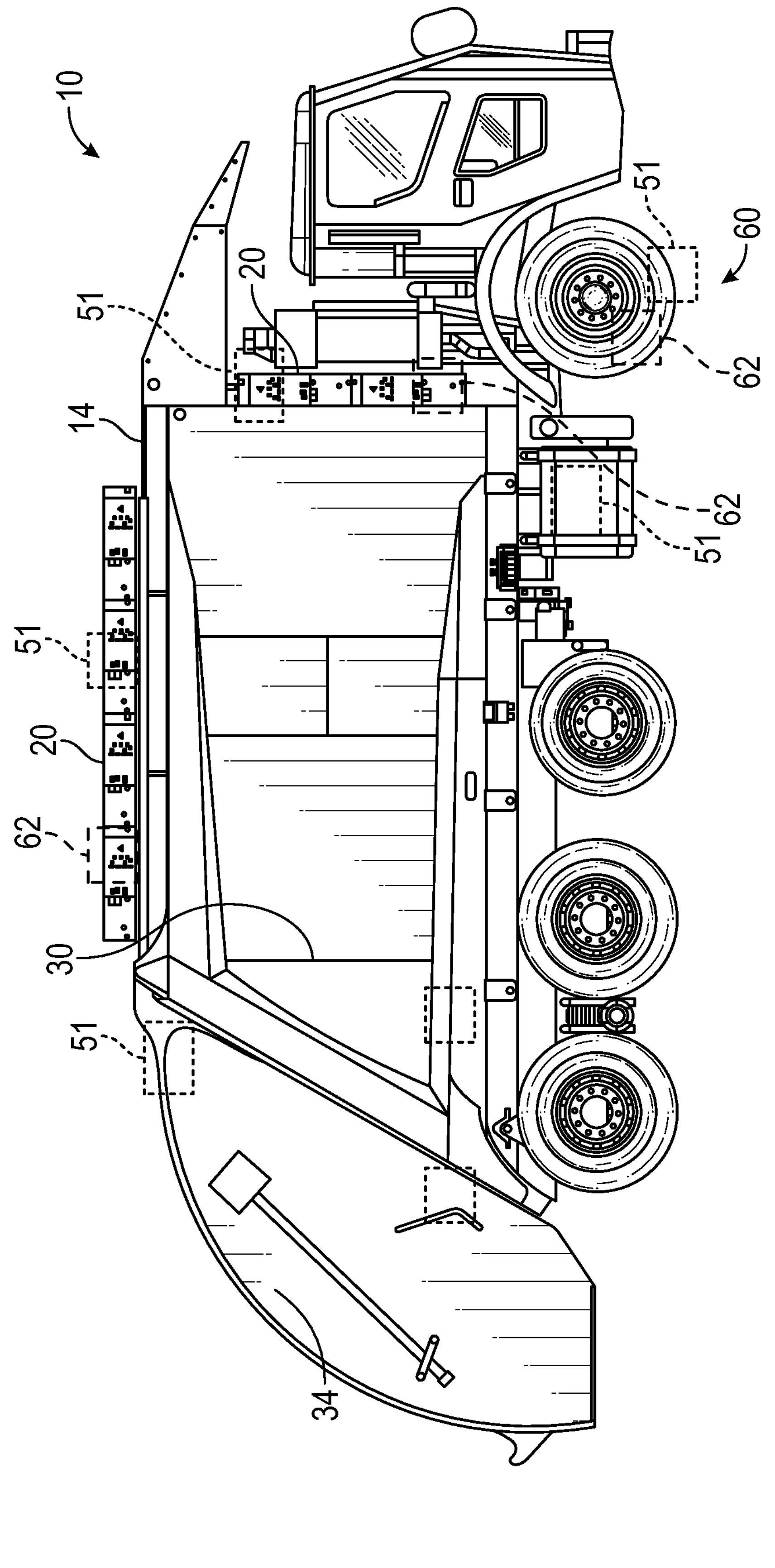
FIGS. 11A-11B are the refuse vehicle of FIG. 1 having a top mounted battery pod, according to several exemplary embodiments.
Figure 11B:
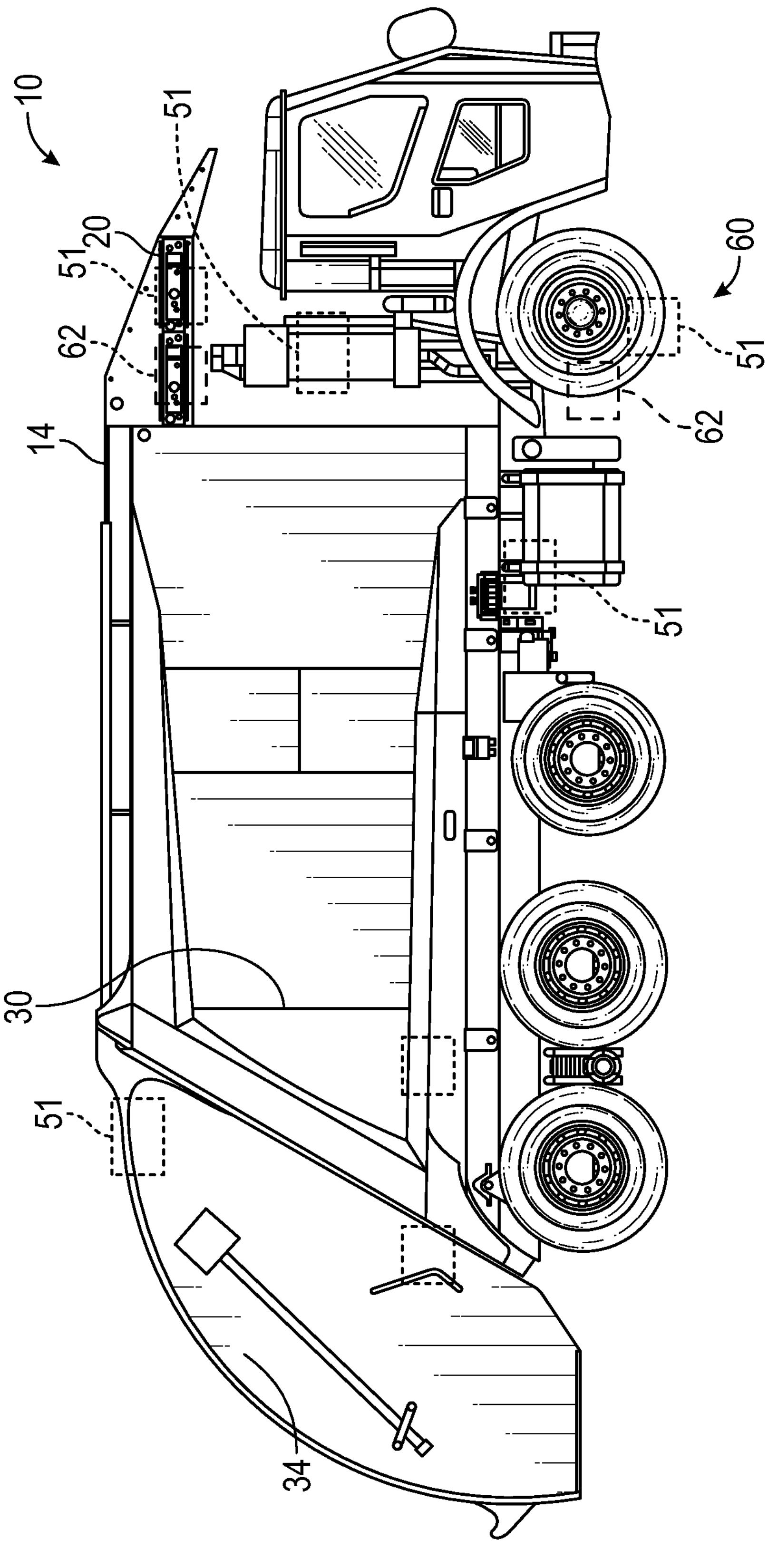

Referring now to FIGS. 11A-11B, several illustrations of another exemplary placement of the energy device 20, the thermal sensors 51, and the thermal stress mitigation devices 62 are shown, according to several exemplary embodiments. In various embodiments, the energy device 20, the thermal sensors 51, and the thermal stress mitigation devices 62 are coupled to a top portion of the refuse vehicle 10. For example, the energy device 20, the thermal sensors 51, and the thermal stress mitigation devices 62 may be coupled to a top portion of refuse compartment 30 and/or above the cab 16 (e.g., as shown in FIGS. 9A-9B). In some embodiments, the energy device 20, the thermal sensors 51, and the thermal stress mitigation devices 62 are coupled to a canopy (or other structural element) located above the cab 16. Additionally or alternatively, the energy device 20 (or components thereof), the thermal sensors 51, and the thermal stress mitigation devices 62 may be coupled to the wheels 22. For example, a first component of the energy device 20 (e.g., a battery cell, etc.) may be coupled to an exterior hub region of the wheels 22 and a second component of the energy device 20 (e.g., a power converter, etc.) may be coupled to a structural element (e.g., a portion of frame 12, etc.) above the cab 16. Each of the components of the energy device 20 may have a thermal sensor 51 and one or more thermal stress mitigation devices 62 coupled to or nearby each of the components of the energy device 20. In some embodiments, the placement of the energy device 20, the thermal sensors 51, and the thermal stress mitigation devices 62 shown in FIGS. 9A-9B is preferred for a rear-loading refuse vehicle 10. In various embodiments, the placement of the energy device 20, the thermal sensors 51, and the thermal stress mitigation devices 62 as shown in FIGS. 9A-9B facilitates moving weight (e.g., battery weight, etc.) forward on the refuse vehicle 10 (e.g., toward the cab 16 and away from the tailgate 34, etc.), thereby reducing stress on rear load-bearing components (e.g., a rear axle, etc.).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A refuse vehicle comprising:

a chassis;

a body assembly coupled to the chassis, the body assembly defining a refuse compartment;

a thermal stress mitigation system configured to mitigate against a thermal stress on the refuse vehicle, the thermal stress mitigation system comprising:

a thermal stress mitigation substance;

at least one of a container and a tank configured to store the thermal stress mitigation substance; and one or more nozzles fluidly coupled to the at least one of the container and the tank and operable to deploy the thermal stress mitigation substance, the thermal stress mitigation system configured to deploy the thermal stress mitigation substance into the refuse compartment.

2. The refuse vehicle of claim 1, wherein the thermal stress mitigation system further comprises:

a controller communicatively coupled to and configured to operate the one or more nozzles;

one or more thermal sensors communicatively coupled to the controller and configured to detect the thermal stress on the refuse vehicle.

3. The refuse vehicle of claim 2, wherein the controller is configured to:

receive thermal stress data from the one or more thermal sensors;

determine whether the thermal stress on the refuse vehicle is greater than a threshold thermal stress based on the thermal stress data; and operate the nozzles to deploy the thermal stress mitigation substance on the refuse vehicle responsive to determining that the thermal stress is greater than the threshold thermal stress.

4. The refuse vehicle of claim 3, further comprising at least one of an engine and a motor.

5. The refuse vehicle of claim 4, wherein the thermal stress mitigation system is configured to deploy the thermal stress mitigation substance on the at least one of the engine and the motor.

6. The refuse vehicle of claim 4, wherein the thermal stress mitigation system is positioned proximal an energy device, wherein the energy device is coupled to the motor.

7. The refuse vehicle of claim 1, wherein the refuse vehicle further comprises a lift assembly, wherein the thermal stress mitigation system is configured to deploy the thermal stress mitigation substance on the lift assembly.

8. A refuse vehicle comprising:

a chassis;

a body assembly coupled to the chassis, the body assembly defining a refuse compartment and a hopper;

a thermal stress mitigation system configured to mitigate against a thermal stress on the refuse vehicle, the thermal stress mitigation system comprising:

a thermal stress mitigation substance;

at least one of a container and a tank configured to store the thermal stress mitigation substance; and one or more nozzles fluidly coupled to the at least one of the container and the tank and operable to deploy the thermal stress mitigation substance, the thermal stress mitigation system configured to deploy the thermal stress mitigation substance into the hopper.

* * * * *